United States Patent

Sun

(10) Patent No.: US 9,180,389 B2
(45) Date of Patent: Nov. 10, 2015

(54) FILTER

(71) Applicant: Shenzhen China Star Optoelectronics Technology Co., Ltd., Shenzhen, Guangdong (CN)

(72) Inventor: Jie Sun, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 76 days.

(21) Appl. No.: 14/236,862

(22) PCT Filed: Nov. 29, 2013

(86) PCT No.: PCT/CN2013/088119
§ 371 (c)(1),
(2) Date: Feb. 3, 2014

(87) PCT Pub. No.: WO2015/077972
PCT Pub. Date: Jun. 4, 2015

(65) Prior Publication Data
US 2015/0143785 A1  May 28, 2015

(30) Foreign Application Priority Data
Nov. 26, 2013 (CN) .......................... 2013 1 0611923

(51) Int. Cl.
*B01D 29/00* (2006.01)
*B01D 46/00* (2006.01)
*B01D 46/10* (2006.01)
(Continued)

(52) U.S. Cl.
CPC ............ *B01D 29/0097* (2013.01); *B01D 29/48* (2013.01); *B01D 35/30* (2013.01); *B01D 46/0005* (2013.01); *B01D 46/103* (2013.01)

(58) Field of Classification Search
CPC .......... B01D 29/48; B01D 29/50; B01J 8/006; B01J 8/025; B01J 8/0278; B01J 8/0292; B01J 19/30; B01J 8/0085; C02F 1/001; C10G 31/09
See application file for complete search history.

(56) References Cited

U.S. PATENT DOCUMENTS 3,823,824 A * 7/1974 Close .............................. 210/86
3,984,330 A * 10/1976 Nichols ........................ 210/449
(Continued)

FOREIGN PATENT DOCUMENTS

| CN | 201023006 Y | 2/2008 |
| JP | 2004202473 A | 7/2004 |

OTHER PUBLICATIONS

English Translation of CN201023006 from Patent Translate generated Jun. 14, 2015.*

*Primary Examiner* — Christopher P Jones
*Assistant Examiner* — Britanny Precht
(74) *Attorney, Agent, or Firm* — Andrew C. Cheng

(57) ABSTRACT

A filter includes an enclosure (10) and a filter core (20) mounted inside the enclosure (10). The filter core (20) includes a support (22) and a filtering element (24) entangled with the support (22). The enclosure (10) is of a spherical form and includes: a main body (12), an inlet passage (14) mounted to an upper portion of the main body (12), an outlet passage (16) mounted to a lower portion of the main body (12), and a ventilation tube (18) mounted to a top of the main body (12). The filtering element (24) is set in a spherically-shaped spiral so that the filter core (20) has reduced filtering areas at a top and a bottom ends thereof and an enlarged filtering area at a middle portion.

14 Claims, 4 Drawing Sheets

(51) Int. Cl.
    *B01D 35/30*     (2006.01)
    *B01D 29/48*     (2006.01)

(56) References Cited

U.S. PATENT DOCUMENTS

| | | | |
|---|---|---|---|
| 5,186,834 A * | 2/1993 | Arai | 210/413 |
| 5,584,411 A * | 12/1996 | Channell et al. | 220/62.19 |
| 5,647,977 A * | 7/1997 | Arnaud | 210/167.3 |
| 2004/0031748 A1 * | 2/2004 | Kochert et al. | 210/488 |
| 2011/0136567 A1 * | 6/2011 | Bichl et al. | 463/25 |
| 2011/0147319 A1 | 6/2011 | Cottard et al. | |
| 2014/0250846 A1 * | 9/2014 | Walls et al. | 55/500 |

\* cited by examiner

FILTER

BACKGROUND OF THE INVENTION

1. Field of the Invention

The present invention relates to the technical field of filtering devices, and in particular to a filter.

2. the Related Arts

Filters have been widely used in various industries and businesses, such as medicine related chemical engineering, food, paper-making, and mineral oil production. All the filters that are used in every industry and application provide the same function of filtering a medium, such as water, oil, gases, and solvents. The most commonly used filters are small-sized equipment for removing a minority of solid particles from a liquid in order to protect the normal operation of facility. When the liquid flows into a filter can in which a filter screen of a predetermined specification is installed, the impurities entraining the liquid will be blocked so that a cleaned liquid is discharged from an outlet port of the filter. To cleanse the filter, the filter can is released and removed and is re-installed after being properly treated. Thus, use and maintenance are both easy.

A liquid crystal display (LCD) has various advantages, such as thin device body, low power consumption, and being free of radiation, and is thus of wide applications. However, it is commonly known that the liquid crystal display is a passive luminous device, meaning the liquid crystal material itself does not give off light. Thus, most of the liquid crystal displays that are currently available in the market are backlighting type liquid crystal displays, which generally comprise a liquid crystal display panel and a backlight module.

In a manufacturing process of a thin-film transistor liquid crystal display (TFT-LCD), a filter that is generally of a cylindrical shape or a tub configuration. A filter of such a configuration often suffers, in the use thereof, short lifespan and frequent replacement, this being disadvantageous for cost control. Product switching of a production line often encounters difficulties of cleansing pipe lines of filters (such as an array coater often having the problem that coagulation of photoresist occurs at the bottom of a filter in the switching of product, where the residues of photoresist on an inside surface of the fiber can only be removed through dipping in thinner and rinsing for multiple times), leading to poor efficiency of product switching and waste of solvents.

SUMMARY OF THE INVENTION

An object of the present invention is to provide a filter, which comprises a filter element that adopts a spherical form of a helical wire arrangement to facilitate extension of lifespan of the filter and which filter provides a function of gas/liquid separation so that using such a filter in the field of manufacture of liquid crystal displays enables reduction of the times of cleansing the filter and the time of dipping so as to increase the efficiency of product switching.

To achieve the object, the present invention provides a filter, which comprises: an enclosure and a filter core mounted inside the enclosure. The filter core comprises a support and a filtering element entangled with the support. The enclosure is of a spherical form and comprises: a main body, an inlet passage mounted to an upper portion of the main body, an outlet passage mounted to a lower portion of the main body, and a ventilation tube mounted to a top of the main body. The filtering element is set in a spherically-shaped spiral so that the filter core has reduced filtering areas at a top and a bottom ends thereof and an enlarged filtering area at a middle portion.

The filtering element has a central axis that is coaxial with a central axis of the enclosure. The support has a bottom end that is coupled to a bottom of the enclosure through threading engagement. The support has a top that is positioned with respect to the top of the enclosure through fitting engagement.

The support is a hollow cylinder.

The support has an outer circumference along which a plurality of retention bars is arranged. The retention bars are set horizontally. The plurality of retention bars each have an end connected to the support and an opposite end penetrating into the filtering element to improve mechanical strength of the filtering element.

The filtering element is formed through melt-blowing of a filtering material conducted along the support so as to entangle therewith. The filtering material is entangled with the support at an angle of 45° with respect to both longitude and latitude. The filtering element has small volumes of the filtering material at the top and the bottom thereof and a large volume of the filtering material at the middle thereof.

The filtering material comprises a polymeric fiber or polyester spun-bonded nonwoven fabric.

The inlet passage is mounted to the upper portion of the enclosure at any position along a circumference that is at an angle of 15° with respect to the central axis of the enclosure and the outlet passage is mounted to the lower portion of the enclosure at any position along a circumference that is at an angle of 165° with respect to the central axis of the enclosure.

A connection of the inlet passage and the filtering element is provided with a flow guide element for guiding a hydraulic fluid to flow, following the spherically-shaped spiral structure of the filtering element, from the top of the filtering element through interior of the filtering element to be filtered thereby.

The ventilation tube comprises a control valve that controls discharge of gas.

The enclosure further comprises two mounting stands that are arranged symmetrically at two sides of the lower portion of the main body to fixedly support the filter.

The present invention also provides a filter, which comprises: an enclosure and a filter core mounted inside the enclosure, the filter core comprising a support and a filtering element entangled with the support, the enclosure being of a spherical form and comprising: a main body, an inlet passage mounted to an upper portion of the main body, an outlet passage mounted to a lower portion of the main body, and a ventilation tube mounted to a top of the main body, the filtering element being set in a spherically-shaped spiral so that the filter core has reduced filtering areas at a top and a bottom ends thereof and an enlarged filtering area at a middle portion;

wherein the filtering element has a central axis that is coaxial with a central axis of the enclosure, the support having a bottom end that is coupled to a bottom of the enclosure through threading engagement, the support having a top that is positioned with respect to the top of the enclosure through fitting engagement;

wherein the support is a hollow cylinder;

wherein the support has an outer circumference along which a plurality of retention bars is arranged, the retention bars being set horizontally, the plurality of retention bars each having an end connected to the support and an opposite end penetrating into the filtering element to improve mechanical strength of the filtering element;

wherein the filtering element is formed through melt-blowing of a filtering material conducted along the support so as to entangle therewith, the filtering material being entangled with the support at an angle of 45° with respect to both longitude and latitude, the filtering element having small volumes of the filtering material at the top and the bottom thereof and a large volume of the filtering material at the middle thereof; and wherein the filtering material comprises a polymeric fiber or polyester spun-bonded nonwoven fabric.

The inlet passage is mounted to the upper portion of the enclosure at any position along a circumference that is at an angle of 15° with respect to the central axis of the enclosure and the outlet passage is mounted to the lower portion of the enclosure at any position along a circumference that is at an angle of 165° with respect to the central axis of the enclosure.

A connection of the inlet passage and the filtering element is provided with a flow guide element for guiding a hydraulic fluid to flow, following the spherically-shaped spiral structure of the filtering element, from the top of the filtering element through interior of the filtering element to be filtered thereby.

The ventilation tube comprises a control valve that controls discharge of gas.

The enclosure further comprises two mounting stands that are arranged symmetrically at two sides of the lower portion of the main body to fixedly support the filter.

The efficacy of the present invention is that the present invention provides a filter, which comprises a filtering element arranged in a spherically-shaped spiral structure, which, as compared to the conventional cylindrical structure, provides the filtering element with an increased volume so as to increase the filtering area thereof thereby facilitating extension of lifespan of the filter. The filter also provides a function of gas/liquid separation. In the application of the filter in the field of manufacture of liquid crystal displays, by using the filtering areas of the filtering element at the top and bottom being smaller and that of the middle being large, the liquid flow rate and flow speed in a unit time at the top and the bottom can be increased so as to provide an effect of flushing at the bottom and thus allow the times of cleaning and the time period of dipping for cleansing the filter to be reduced thereby improving efficiency of product switching.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

Figure 1:
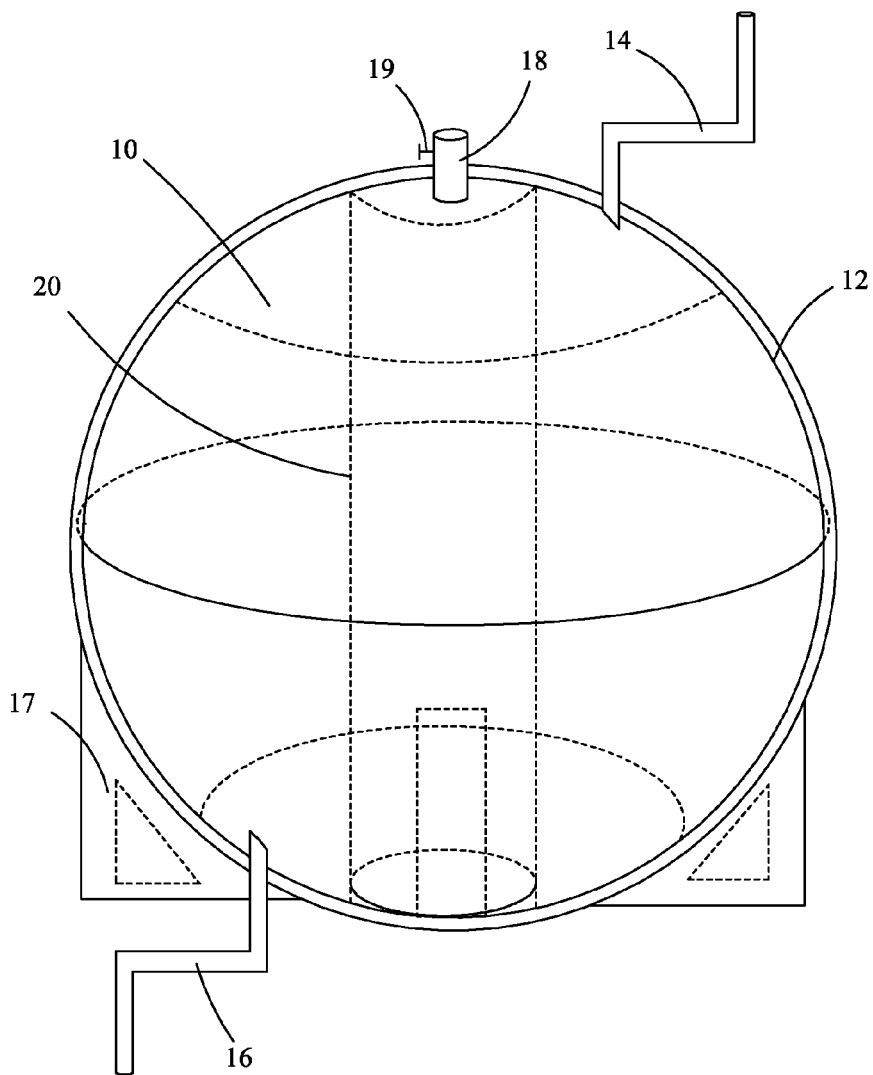
FIG. 1 is a schematic view showing the structure of a filter according to the present invention.

To further expound the technical solution adopted in the present invention and the advantages thereof, a detailed description is given to a preferred embodiment of the present invention and the attached drawings.

The present invention provides a filter, which is generally used in various industries, including medicine-related chemical engineering, food, papermaking, mineral oil production, and TFT (Thin-Film Transistor) device manufacturing, for filtering various media, such as water, oil, gases, and solvents. Referring to FIGS. 1-4, the present invention provides a filter that is applicable to a hydraulic fluid passage and can be arranged at the upstream or downstream side of a hydraulic pump to filter all the pressure medium volume flows of the hydraulic pump, and specifically comprises: an enclosure 10 and a filter core 20 mounted inside the enclosure 10. The filter core 20 comprises a support 22 and a filtering element 24 entangled with the support 22. The enclosure 10 is of a spherical form and comprises: a main body 12, an inlet passage 14 mounted to an upper portion of the main body 12, an outlet passage 16 mounted to a lower portion of the main body 12, and a ventilation tube 18 mounted to a top of the main body 12. The filtering element 24 is set in a spherically-shaped spiral so that the filter core 20 has reduced filtering areas at a top and a bottom ends thereof and an enlarged filtering area at a middle portion, wherein the liquid flow rate and flow speed in a unit time is increased at the top and bottom of the filter core 20 so as to provide an effect of flushing at the bottom and thus allow the times of cleaning and the time period of dipping for cleansing the filter to be reduced thereby improving efficiency of product switching. Further, compared to the conventionally used cylindrical structure, the filtering element 24 has an increased volume so as to increase the filtering area thereof thereby facilitating extension of lifespan of the filter. The filter also provides a function of gas/liquid separation.

Figure 2:
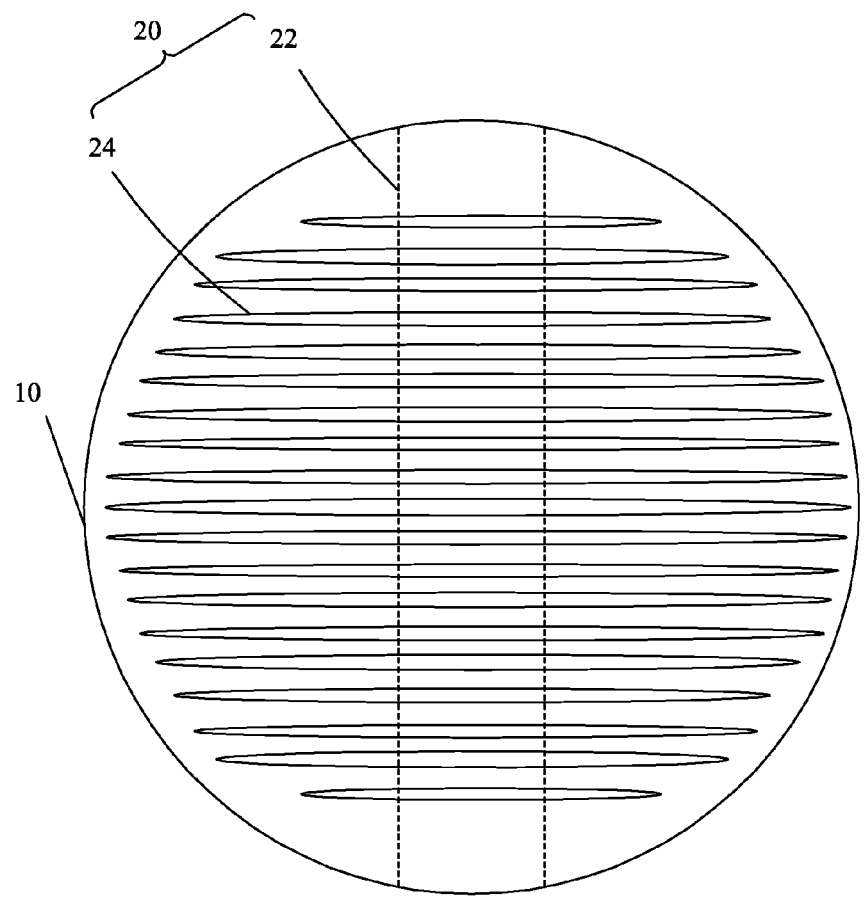
FIG. 2 is a schematic view showing a central axis of a filter element of the present invention concentric with a central axis of an enclosure.

The filtering element 24 has a central axis that is coaxial with a central axis of the enclosure 10, as shown in FIG. 2. The support 22 has a bottom end that is coupled to a bottom of the enclosure 10 through threading engagement. The support 22 has a top that is positioned with respect to the top of the enclosure 10 through fitting engagement.

Figure 3:
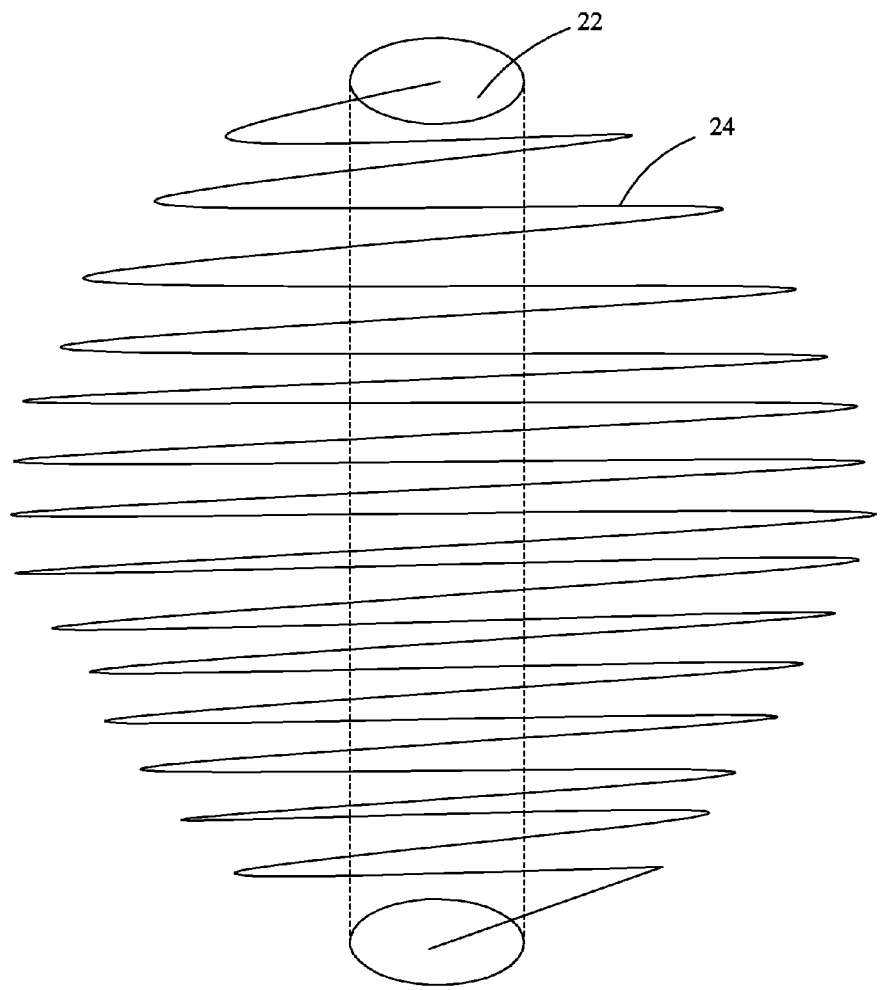
FIG. 3 is a schematic view showing a filtering material of the present invention wrapping around a support.

In the instant embodiment, the support 22 is preferably a hollow cylinder. The filtering element 24 is formed through melt-blowing of a filtering material conducted along the support 22 so as to entangle therewith. The filtering material is entangled with the support 22 at an angle of 45° with respect to the directions of both longitude and latitude so as to form a three-dimensional sphere. When viewed from the top side, the filtering material of the filtering element 24 shows a spiral structure and this arrangement achieves the volumes of the filtering material at the top and bottom of the filtering element 24 being small and that at the middle being large, as shown in FIG. 3. The filtering material is preferably a polymeric fiber or polyester spun-bonded nonwoven fabric.

Figure 4:
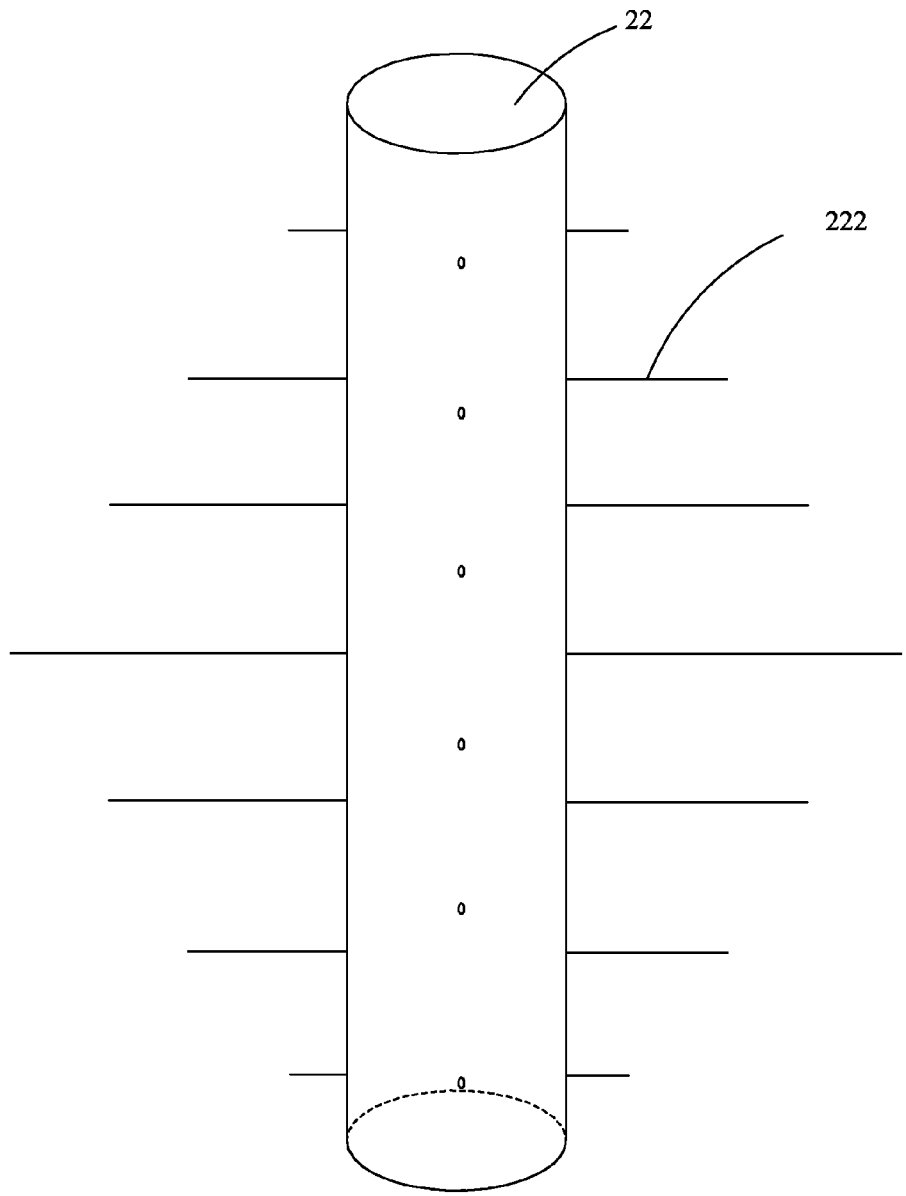
FIG. 4 is a schematic view showing a plurality of retention bars of the filter of the present invention mounted to the support.

Further, referring to FIG. 4, in the present invention, the support 22 has an outer circumference along which a plurality of retention bars 222 is arranged. The plurality of retention bars 222 each has an end connected to the support 22 and an opposite end penetrating into the filtering element 24 to improve the mechanical strength of the filtering element 24 so as to prevent the filtering element 24 from deformation even under the flushing of the hydraulic fluid and to maintain the consistence of pores size of the fiber of the filtering material and service life. The retention bars 222 are set horizontally and the ones of the retention bars 222 that are located at the top end and the bottom end of the support 22 are relatively short and those retention bars 222 located at the middle of the support 22 are relatively long.

The inlet passage 14 is mounted to the upper portion of the enclosure 10 at any position along a circumference that is at an angle of 15° with respect to the central axis of the enclosure 10. The outlet passage 16 is mounted to the lower portion of the enclosure 10 at any position along a circumference that is at an angle of 165° with respect to the central axis of the enclosure 10. This arrangement makes the outlet passage 16 lower than the inlet passage 14. The hydraulic fluid passes through the inlet passage 14 to enter the interior of the filter and tiny gas bubbles entraining the hydraulic fluid are caused by buoyance to move toward the upper portion of the enclosure 10 to be then released through the ventilation tube 18 mounted at the top thereby achieving the effect of gas/liquid separation. The hydraulic fluid, which contains no or minor gas bubbles entraining therewith, is drained through the outlet passage 16 at the lower portion. The present invention makes use of the arrangement of the ventilation tube 18 to provide the filter with the function of gas/liquid separation so as to omit the use of a devoted gas/liquid separation device. The ventilation tube 18 comprises a control valve 19, which controls the discharge of the gas.

The connection of the inlet passage 14 and the filtering element 24 is provided with a flow guide element (not shown) for guiding the hydraulic fluid to flow, following the spherically-shaped spiral structure of the filtering element 24, from the top end of the filtering element 24 through the interior of the filtering element 24 to be filtered thereby.

The enclosure 10 further comprises two mounting stands 17 that are arranged symmetrically at two sides of the lower portion of the main body 12 to fixedly support the filter.

In summary, the present invention provides a filter, which comprises a filtering element arranged in a spherically-shaped spiral structure, which, as compared to the conventional cylindrical structure, provides the filtering element with an increased volume so as to increase the filtering area thereof thereby facilitating extension of lifespan of the filter. The filter also provides a function of gas/liquid separation. In the application of the filter in the field of manufacture of liquid crystal displays, by using the filtering areas of the filtering element at the top and bottom being smaller and that of the middle being large, the liquid flow rate and flow speed in a unit time at the top and the bottom can be increased so as to provide an effect of flushing at the bottom and thus allow the times of cleaning and the time period of dipping for cleansing the filter to be reduced thereby improving efficiency of product switching.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A filter, comprising: an enclosure and a filter core mounted inside the enclosure, the filter core comprising a support and a filtering element entangled with the support, the enclosure being of a spherical form and comprising: a main body, an inlet passage mounted to an upper portion of the main body, an outlet passage mounted to a lower portion of the main body, and a ventilation tube mounted to a top of the main body, the filtering element being set in a spherically-shaped spiral so that the filter core has reduced filtering areas at a top and a bottom ends thereof and an enlarged filtering area at a middle portion;
wherein the support has an outer circumference along which a plurality of retention bars is arranged, the retention bars being set horizontally, the plurality of retention bars each having an end connected to the support and an opposite end penetrating into the filtering element to improve mechanical strength of the filtering element.

2. The filter as claimed in claim 1, wherein the filtering element has a central axis that is coaxial with a central axis of the enclosure, the support having a bottom end that is coupled to a bottom of the enclosure through threading engagement, the support having a top that is positioned with respect to the top of the enclosure through fitting engagement.

3. The filter as claimed in claim 2, wherein the support is a hollow cylinder.

4. The filter as claimed in claim 1, wherein the filtering element is formed through melt-blowing of a filtering material conducted along the support so as to entangle therewith, the filtering material being entangled with the support at an angle of 45° with respect to both longitude and latitude, the filtering element having small volumes of the filtering material at the top and the bottom thereof and a large volume of the filtering material at the middle thereof.

5. The filter as claimed in claim 4, wherein the filtering material comprises a polymeric fiber or polyester spun-bonded nonwoven fabric.

6. The filter as claimed in claim 1, wherein the inlet passage is mounted to the upper portion of the enclosure at any position along a circumference that is at an angle of 15° with respect to the central axis of the enclosure and the outlet passage is mounted to the lower portion of the enclosure at any position along a circumference that is at an angle of 165° with respect to the central axis of the enclosure.

7. The filter as claimed in claim 1, wherein a connection of the inlet passage and the filtering element is provided with a flow guide element for guiding a hydraulic fluid to flow, following the spherically-shaped spiral structure of the filtering element, from the top of the filtering element through interior of the filtering element to be filtered thereby.

8. The filter as claimed in claim 1, wherein the ventilation tube comprises a control valve that controls discharge of gas.

9. The filter as claimed in claim 1, wherein the enclosure further comprises two mounting stands that are arranged symmetrically at two sides of the lower portion of the main body to fixedly support the filter.

10. A filter, comprising: an enclosure and a filter core mounted inside the enclosure, the filter core comprising a support and a filtering element entangled with the support, the enclosure being of a spherical form and comprising: a main body, an inlet passage mounted to an upper portion of the main body, an outlet passage mounted to a lower portion of the main body, and a ventilation tube mounted to a top of the main body, the filtering element being set in a spherically-shaped spiral so that the filter core has reduced filtering areas at a top and a bottom ends thereof and an enlarged filtering area at a middle portion;
wherein the filtering element has a central axis that is coaxial with a central axis of the enclosure, the support having a bottom end that is coupled to a bottom of the enclosure through threading engagement, the support having a top that is positioned with respect to the top of the enclosure through fitting engagement;
wherein the support is a hollow cylinder;
wherein the support has an outer circumference along which a plurality of retention bars is arranged, the retention bars being set horizontally, the plurality of retention bars each having an end connected to the support and an opposite end penetrating into the filtering element to improve mechanical strength of the filtering element;
wherein the filtering element is formed through melt-blowing of a filtering material conducted along the support so as to entangle therewith, the filtering material being entangled with the support at an angle of 45° with respect to both longitude and latitude, the filtering element having small volumes of the filtering material at the top and the bottom thereof and a large volume of the filtering material at the middle thereof; and wherein the filtering material comprises a polymeric fiber or polyester spun-bonded nonwoven fabric.

11. The filter as claimed in claim 10, wherein the inlet passage is mounted to the upper portion of the enclosure at any position along a circumference that is at an angle of 15° with respect to the central axis of the enclosure and the outlet passage is mounted to the lower portion of the enclosure at any position along a circumference that is at an angle of 165° with respect to the central axis of the enclosure.

12. The filter as claimed in claim 10, wherein a connection of the inlet passage and the filtering element is provided with a flow guide element for guiding a hydraulic fluid to flow, following the spherically-shaped spiral structure of the filtering element, from the top of the filtering element through interior of the filtering element to be filtered thereby.

13. The filter as claimed in claim 10, wherein the ventilation tube comprises a control valve that controls discharge of gas.

14. The filter as claimed in claim 10, wherein the enclosure further comprises two mounting stands that are arranged symmetrically at two sides of the lower portion of the main body to fixedly support the filter.

\* \* \* \* \*